Aug. 26, 1958   M. A. HALVERSON   2,849,243
TRAILER HITCH
Filed March 13, 1957   2 Sheets-Sheet 1
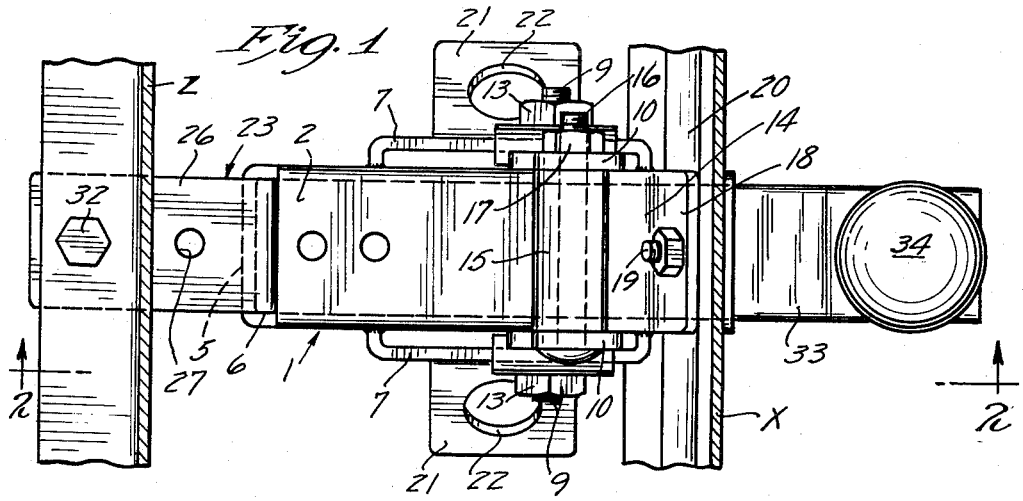
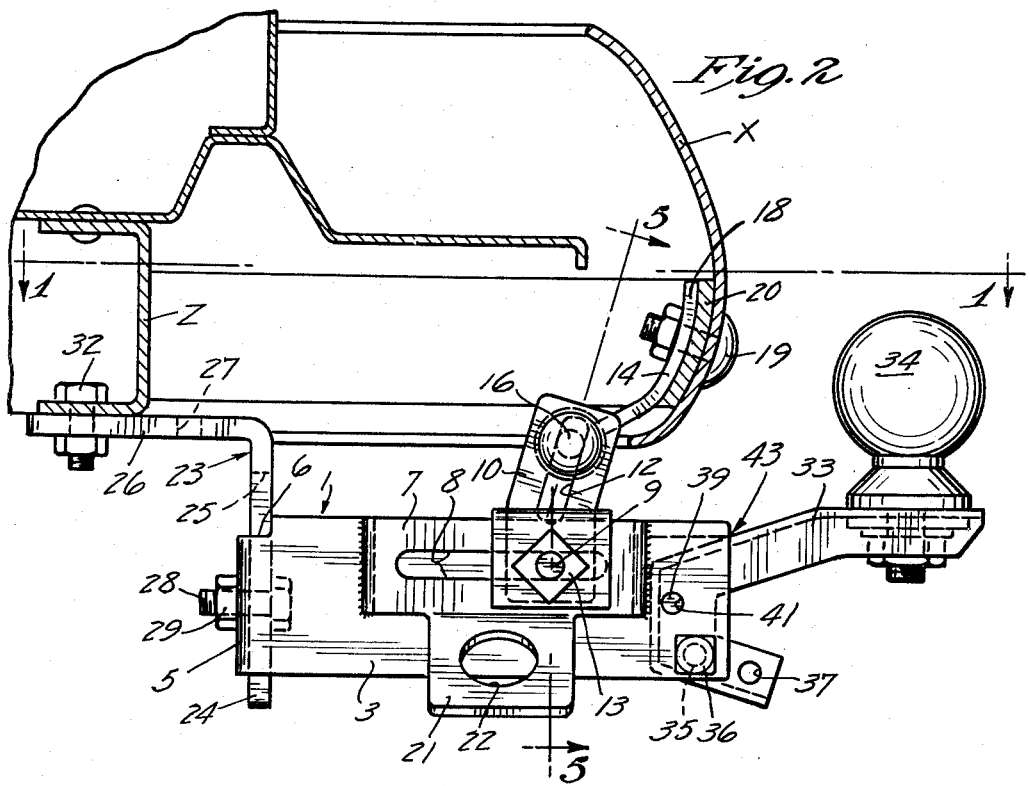
INVENTOR.
Milton A. Halverson
BY
Merchant & Merchant
ATTORNEYS Aug. 26, 1958    M. A. HALVERSON    2,849,243
TRAILER HITCH
Filed March 13, 1957    2 Sheets-Sheet 2
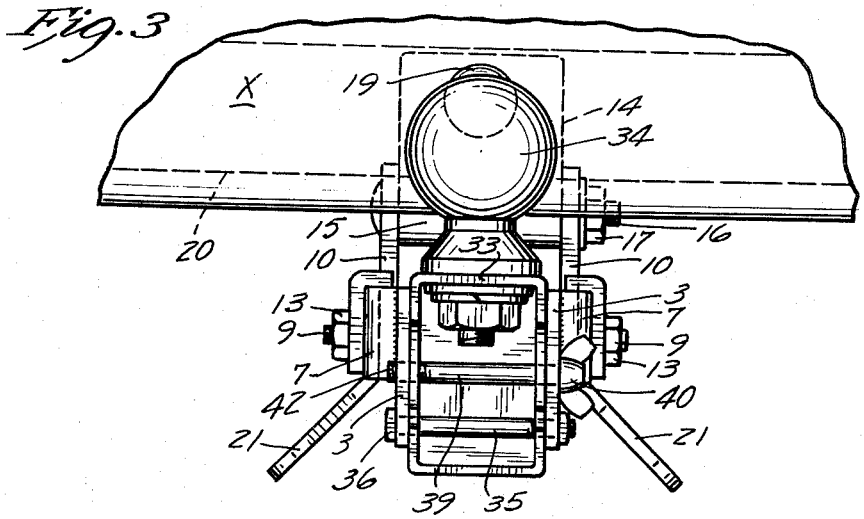
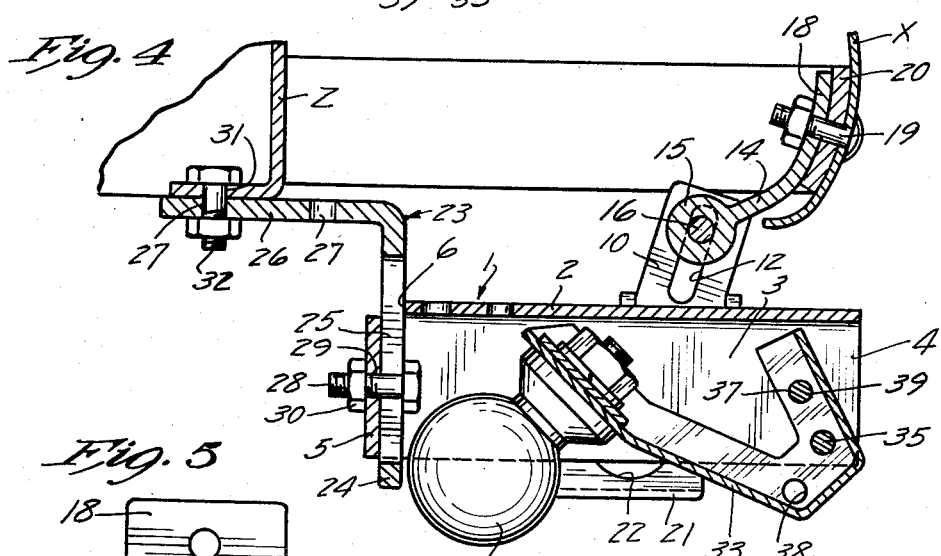
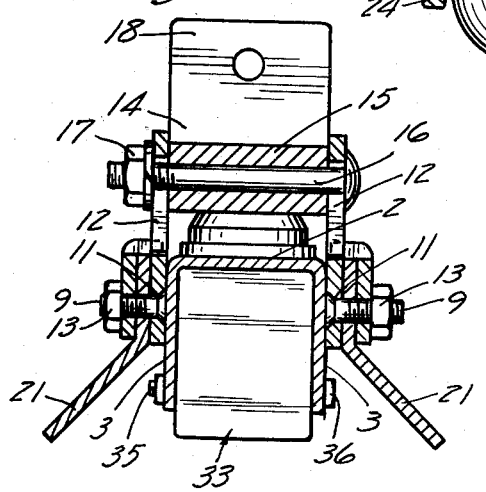
INVENTOR.
Milton A. Halverson
BY
Merchant & Merchant
ATTORNEYS

United States Patent Office 2,849,243
Patented Aug. 26, 1958

2,849,243

TRAILER HITCH

Milton A. Halverson, St. Paul, Minn.

Application March 13, 1957, Serial No. 645,698

6 Claims. (Cl. 280—491)

My invention relates generally to trailer hitches, and more particularly to trailer hitches of the type wherein the hitch ball is mounted for pivotal swinging movements from an operative position projecting rearwardly of the rear bumper of the vehicle to an inoperative position below the plane of the bumper and forwardly with respect thereto.

The primary object of my invention is the provision of a novel structure of the type immediately above described which is extremely rugged in construction and durable.

A further object of my invention is the provision of a device of the class described which is relatively inexpensive to produce, which is relatively easy to render operative or inoperative, and which provides a maximum of safety.

A still further object of my invention is the provision of a device of the class described wherein novel means is provided for detachably securing same to conventional automotive vehicles of varying makes with a maximum of security and with a minimum of parts.

The above and still further objects of my invention will become apparent from the following detailed specification, appended claims and attached drawings.

Referring to the drawings, which illustrate the invention, and in which like characters indicate like parts throughout the several views:

Fig. 1 is a fragmentary view partly in top plan and partly in section, taken substantially on the line 1—1 of Fig. 2 and showing my device as applied to the bumper and rear frame portion of an automotive vehicle;

Fig. 2 is a fragmentary view partly in side elevation and partly in vertical section taken substantially on the line 2—2 of Fig. 1;

Fig. 3 is a fragmentary view in rear elevation;

Fig. 4 is a vertical section longitudinally of my trailer hitch, showing the hitch ball in a retracted position; and Fig. 5 is a vertical section taken substantially on the line 5—5 of Fig. 2.

Referring with greater particularity to the drawings, the numeral 1 indicates in its entirety an elongated inverted channel shaped body comprising a top 2 and depending opposed sides 3. The rear end of the body 1 is open as indicated at 4, whereas the forward end thereof is partially closed by a transverse anchoring plate 5 which connects the sides 3. It will be noted that the top 2 of the body 1 and the anchoring plate 5 are spaced apart as at 6 to define a slot, the purpose of which will hereinafter be explained in detail. Body 1, and parts associated therewith and forming a part thereof, are preferably formed from relatively tough sheet steel or the like.

Welded, or otherwise rigidly secured to the opposite sides 3 of the body 1 in laterally outwardly spaced parallel relation thereto and extending longitudinally thereof, are a pair of elongated guide rails 7 having longitudinally extended slots 8 therein for the reception of nut-equipped anchoring bolts 9. A pair of anchoring ears 10 have apertures 11 in their lower ends and elongated substantially vertically extended slots 12 in their upper end portions. As shown particularly by reference to Figs. 2 and 5, the apertured lower end portions of the anchoring ears 10 are received one each between an opposite side portion 3 of the body and one of said guide rails 7, with an anchoring bolt 9 projecting through the aperture 11 therein whereby the upper end portion thereof, with the slot 12 therein, projects above the top 2. By this arrangement, it should be obvious that longitudinal adjustments of the anchoring ears 10 with respect to the body 1 may be achieved through loosening and tightening of the laterally outwardly exposed burrs 13 carried by the anchoring bolts 9.

An anchoring tongue 14 is provided with a tubular or looped inner end 15 for the reception of a nut-equipped anchoring bolt 16 which extends therethrough and through the aligned slots 12 in the upper end portions of the anchoring ears 10. It should be clear that tightening and loosening of the nut 17 on one end of the anchoring bolt 12 and vertical movement of the anchoring bolt 16 in the slots 12 brings about considerable adjustability for the purpose of attaching the generally arcuate outer end portion 18 of the anchoring tongue 14 to the rear bumper X of conventional automotive vehicles of varying makes and styles. Note that this may be accomplished by means of the nut-equipped bolt 19 which conventionally secures the intermediate portion of the rear bumper X to a frame portion 20 of the vehicle.

Preferably, and as shown, the guide rails 7 are formed to provide integral downwardly and outwardly flaring anchoring lugs 21 having apertures 22 therein for the reception of one end of an emergency chain or the like which has its opposite end securely anchored to any suitable portion of the undercarriage of the vehicle, not shown.

An angular anchoring bracket 23, preferably and as shown formed from steel bar stock, has one end portion 24 provided with a longitudinally extended slot 25, whereas the opposite end portion 26 is provided with one or more longitudinally spaced apertures 27 extending therethrough. One means of use of the anchoring bracket 23 is shown in Figs. 2 and 4 wherein the end 24 extends downwardly through the slot 6 with a nut-equipped anchoring bolt 28 extending through the slot 25 and through an aperture 29 in the anchoring plate 5. Here again, loosening and tightening of the burr 30 on the anchoring bolt 28 permits considerable vertical movement of the horizontally disposed portion 26 of the anchoring bracket 23 so as to permit passage through one of the apertures 27 therein and through an aligned aperture 31 in an adjacent portion of the frame Z of said vehicle, of a suitable nut-equipped anchoring bolt 32. As necessity requires, and in order to attach my novel structure to one of the numerous makes and types of vehicles, it should be obvious that the anchoring bracket may be reversed so that the portion 26 thereof projects rearwardly instead of forwardly, or alternatively either end 24 or 26 thereof could be caused to overlie the top 2 with an anchoring bolt extending through the slot 25 or a given one of the apertures 27. In short, the combination of adjustable anchoring portions above described makes it possible to quickly and safely anchor the body 1 of my novel structure to substantially all known makes and types of vehicles.

An elongated member 33, preferably and as shown formed from channel iron or the like, has a hitch ball 34 rigidly mounted on one end thereof. The hitch ball-carrying member 33 is snugly received between the opposite sides 3 of the inverted channel shaped body 1 and is pivotally secured thereto by means of a nut-equipped pivot bolt or pin 35 which extends therethrough and through aligned apertures in the side walls 3, not specifically identified. Preferably, and as shown, the pivot pin 35 is provided with a head 36. As shown particularly in Figs. 2 and 4, the ball-carrying member 33 is provided with spaced apertures 37 and 38 respectively for reception of a locking pin 39 having a winged head 40 at one end thereof. The apertures 37 and 38 are selectively alignable with aligned apertures 41 in the side walls 3 of the body 1, only one of said apertures being shown. The pin 39 is adapted to pass through the apertures 41 and the aligned apertures 37 and 38. With reference to Fig. 3, it will be seen that the end of the pin 39 opposite the head 40 thereof is threaded as indicated at 42, whereby the pin 39 is screw-threaded through the adjacent side wall 3.

As shown in Fig. 2, when the locking pin 39 is caused to pass through the aligned apertures 41 in the side members 3 of the body 1 and through the apertures 37 and 38 in the ball-carrying member 33, the hitch ball 34 is in its extended operative position projecting rearwardly of the body 1. It will be noted that in this operative position, the intermediate portion of the ball-carrying member 33 is in engagement with the undersurface of the top 2 of the body 1, as indicated by the numeral 43. This arrangement obviously limits shearing action of the ball-carrying member 33 upon the locking pin 39 due to forces exerted upon the hitch ball 34 in an upward direction.

As shown in Fig. 4, when said locking pin 39 is caused to pass through the aligned apertures 41 and 37, the hitch ball 34 is in its retracted inoperative position underlying the body 1 forwardly with respect to the pivot pin 35. In this retracted position, it should be obvious that the ball 34 is no longer visible; nor can it be engaged or damaged in any manner by impact of a car from the rear.

My invention has been thoroughly tested and found to be completely satisfactory for the accomplishment of the above objects and while I have shown a preferred embodiment thereof, it should be clear that my invention is capable of modification without departure from the scope and spirit of the appended claims.

What I claim is:

1. In a device of the class described, an inverted rearwardly opening channel-shaped body comprising a top and opposed sides, means for detachably securing said body to the undercarriage of an automotive vehicle in close proximity to and below the plane of the rear bumper thereof with said channel extending parallel to the direction of travel of said vehicle, an elongated hitch ball-carrying member, means pivotally mounting one end portion of said member intermediate the sides of said body for swinging movements of its ball-equipped opposite end from an extended position projecting rearwardly of said body to a retracted position underlying said body forwardly of said pivot, a pair of laterally spaced anchoring ears secured to opposite sides of said body and projecting upwardly therefrom, an anchoring tongue having one end pivotally secured between said anchoring ears and having means on its opposite end for detachably securing same to said rear bumper, said pivotal connection between said anchoring tongue and said anchoring ears permitting vertical adjustments of said tongue with respect to said body, and the connection between said anchoring ears and said body permitting longitudinal adjustments of said ears with respect to said body.

2. The structure defined in claim 1 in which said body is formed at its forward end to provide an anchoring plate connecting the opposite sides thereof, the top of said body and said anchoring plate being spaced apart to provide a slot, and in further combination with an angular anchoring bracket having one end receivable in said slot and provided with means for detachably securing same to said anchoring plate, the opposite end of said anchoring bracket being provided with means for detachably securing same to the undercarriage of said vehicle forwardly of said rear bumper.

3. In a device of the class described, an inverted rearwardly opening channel-shaped body comprising a top and opposed sides, means for detachably securing said body to the undercarriage of an automotive vehicle in close proximity to and below the plane of the rear bumper thereof with said channel extending parallel to the direction of travel of said vehicle, an elongated hitch ball-carrying member, means pivotally mounting one end portion of said member intermediate the sides of said body for swinging movements of its ball-equipped opposite end from an extended position projecting rearwardly of said body to a retracted position underlying said body forwardly of said pivot, means for locking said member in its extended and retracted positions, an upstanding anchoring ear carried by the longitudinally intermediate portion of said body, and an anchoring tongue having one end pivotally secured to said anchoring ear and having its opposite end adapted to be secured to said rear bumper.

4. The structure defined in claim 3 in which said one end is secured to said anchoring ear for substantially vertical adjustments.

5. The structure defined in claim 3 in which said anchoring ear is secured to said body for longitudinal adjustments relative thereto.

6. In a device of the class described, an inverted rearwardly opening channel-shaped body comprising a top and opposed sides, means for detachably securing said body to the undercarriage of an automotive vehicle in close proximity to and below the plane of the rear bumper thereof with said channel extending parallel to the direction of travel of said vehicle, an elongated hitch ball-carrying member, means pivotally mounting one end portion of said member intermediate the sides of said body for swinging movements of its ball-equipped opposite end from an extended position projecting rearwardly of said body to a retracted position underlying said body forwardly of said pivot, means for locking said member in its extended and retracted positions, an anchoring tongue having one end pivotally adjustably secured to the intermediate portion of said body and adapted to be secured at its opposite end to said rear bumper, said body being formed at its forward end to provide an anchoring plate connecting the opposite sides thereof, the top of said body and said anchoring plate being spaced apart to provide a slot and an angular anchoring bracket having one end receivable in said slot and provided with means for detachably securing same to said anchoring plate, the opposite end of said anchoring bracket being provided with means for detachably securing same to the undercarriage of said vehicle forwardly of said rear bumper.

References Cited in the file of this patent

UNITED STATES PATENTS

| | | |
|---|---|---|
| 2,576,383 | Avery | Nov. 27, 1951 |
| 2,733,936 | Tate | Feb. 7, 1956 |
| 2,753,193 | Halverson | July 3, 1956 |